April 9, 1935.  A. KADOW  1,996,814
CUT-OFF BURNER FOR HOLLOW GLASS ARTICLES
Filed March 6, 1933  2 Sheets—Sheet 1
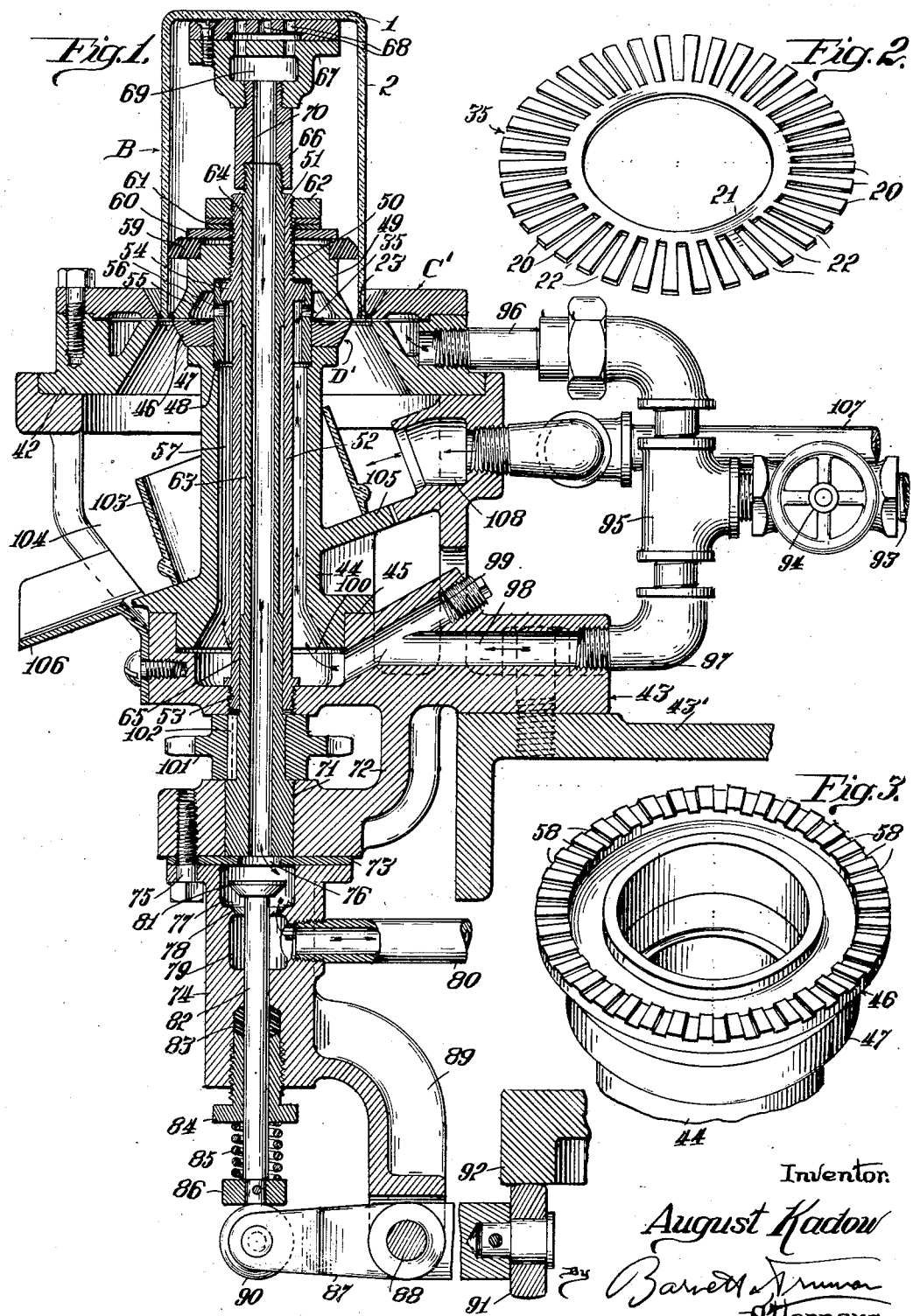
Inventor:
August Kadow April 9, 1935.  A. KADOW  1,996,814
CUT-OFF BURNER FOR HOLLOW GLASS ARTICLES
Filed March 6, 1933  2 Sheets-Sheet 2
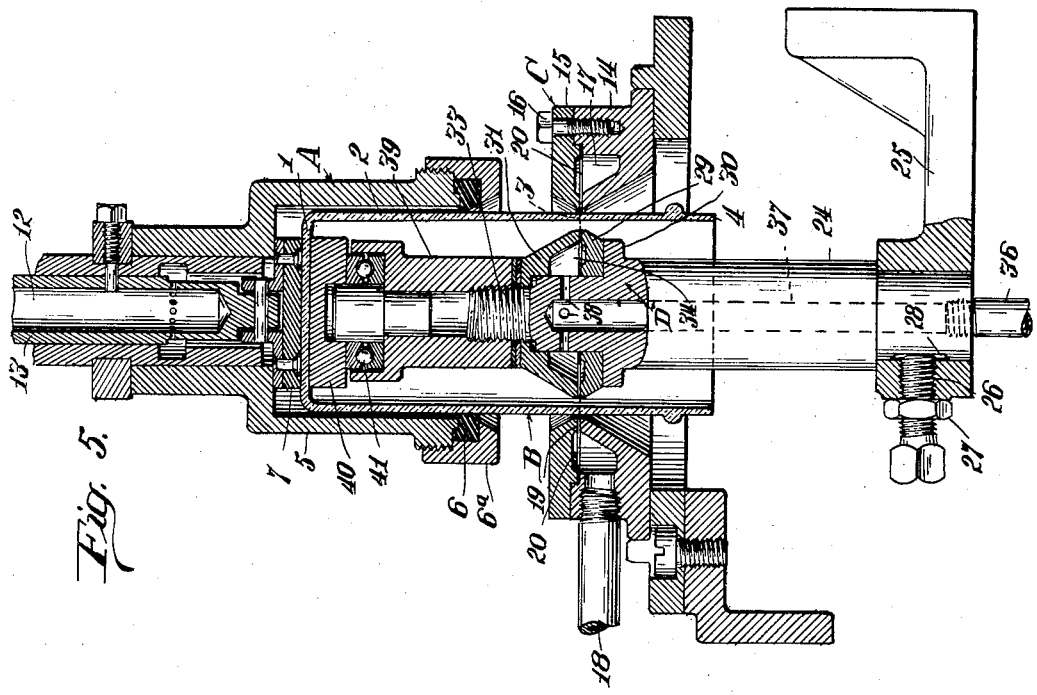
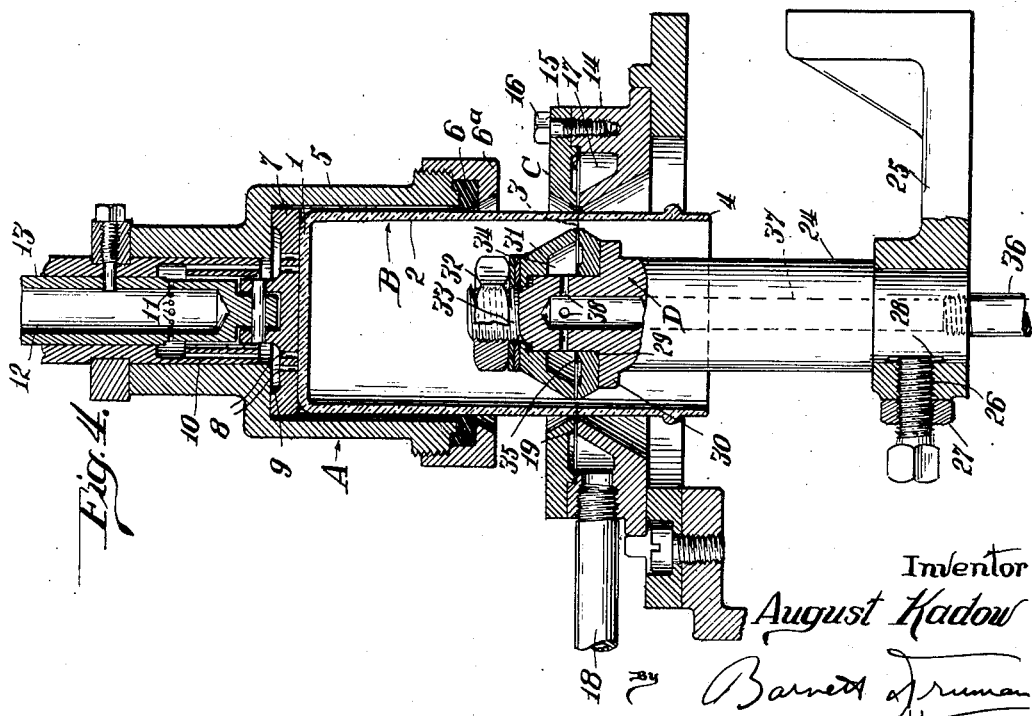
Inventor
August Kadow Patented Apr. 9, 1935

1,996,814

UNITED STATES PATENT OFFICE 1,996,814

CUT-OFF BURNER FOR HOLLOW GLASS ARTICLES

August Kadow, Toledo, Ohio, assignor to The Libbey Glass Manufacturing Company, Toledo, Ohio, a corporation of Ohio Application March 6, 1933, Serial No. 659,815

13 Claims. (Cl. 49—50)

This invention relates to a new and improved method and apparatus for severing glass, and more particularly to improvements in burning off a section of a hollow glass article by projecting a cutting flame or flames against the tubular wall of said article along a predetermined annular line.

The process is now well known in the art of cutting off the moil from a blown hollow glass article such as a tumbler or incandescent bulb by projecting a flame against the outer wall of the glass article from an annular burner which encircles the article, either the article or the burner being rotated during this operation about the central longitudinal axis of the article and burner so that the flames will melt the wall evenly along a predetermined annular line. The moil falls away after the wall has been melted along this line, and the lower edge of the article along the line of severance is formed into a rounded annular bead. This process and apparatus is disclosed in numerous prior patents, for example Kadow and Parker, 1,674,366, granted June 19, 1928, and Parker, 1,757,211, granted May 6, 1930.

According to the present invention, an annular burner is positioned within the hollow glass article so as to project its flame outwardly against the inner surface of the tubular wall. This inner burner may be used alone, but is preferably used in conjunction with an outer annular burner, the two burners being positioned so that the cutting flames will be opposed to one another against the inner and outer surfaces of the glass wall. As a result thicker walled articles may be severed, the time required for the burn-off operation is greatly reduced, and numerous other advantages are obtained as will be hereinafter apparent.

The principal object of this invention is to provide an improved process and apparatus for burning off hollow glass articles, as briefly described hereinabove and disclosed more in detail in the specifications which follow.

Another object is to provide an improved inside burner for severing hollow glass articles.

Another object is to provide a combination of inside and outside annular burners for cooperatively severing hollow glass articles.

Another object is to provide an improved chuck or supporting means for supporting and rotating a hollow glass article by engagement with the inside surface thereof.

Another object is to provide an improved inside spacing means for accurately determining the capacity of a glass tumbler or similar article.

Other articles and advantages of this invention will be more apparent from the following detailed description of certain approved forms of apparatus designed for carrying out the principles of this invention.

In the accompanying drawings:

Fig. 1 is a vertical central section through a preferred form of burn-off unit.

Fig. 2 is a perspective view of an annular shim or spacer used in the inside burner.

Fig. 3 is a perspective view of an alternative form of one of the annular halves of the inside burner.

Fig. 4 is a vertical central section, similar to Fig. 1, showing a simpler form of the invention.

Fig. 5 is a view similar to Fig. 4 showing still another modification.

Reference will first be made to the simpler form of the invention shown in Fig. 4. In the construction there shown, practically all of the apparatus with the exception of the inside burner is of a form now used and well known in the art. The old portion of the apparatus comprises a rotatable holder or chuck A adapted to support the tumbler or other glass article indicated at B, and the outside annular burner indicated generally at C. The hollow glass article B comprises the closed end 1 (normally forming the bottom of the tumbler but positioned uppermost during this burn-off process) and the tubular wall 2 which is to be severed along the line indicated at 3 so as to cut off the waste portion or moil 4 which is discarded and used as cullet.

The chuck A comprises a cup portion 5 adapted to enclose the upper portion of article B and provided with a centering ring 6 of elastic material held in place by the threaded collar 6a and adapted to engage the tubular wall 2 of the article. The suction head 7 is provided with ports 8 communicating through passages 9, 10 and 11 with the main passage 12 in the supporting stem 13, the passage 12 leading to an exhausting means or other source of vacuum. Means is provided for cutting on and off the vacuum at predetermined times so that the glass article may be held securely in place against the head 7 or may be released so that the finished tumbler may be removed and a new tumbler to be cut off placed in the chuck.

The annular burner C comprises a pair of annular members 14 and 15 secured together by bolts 16 so as to enclose an annular chamber 17 into which the combustion fluids (such as a suitable gas and air or oxygen) are conducted from the source of supply through pipe 18. An inner annular slot 19 is provided between the two members 14 and 15, this slot being partially filled by a shim or spacer of the type shown in Fig. 2. This shim has a comb-like construction comprising an annular series of teeth 20 connected by a ring 21 so as to provide spaces 22 between the teeth. (It is to be understood that the shim shown in Fig. 2 is adapted for use in the inside burner hereinafter described. The shim used in the outside burner C will be of similar construction but the connecting ring 21 will be at the outside and the teeth 20 will project inwardly.) The teeth 20 are clamped in the slot 19 so as to provide a plurality of adjacent ports through which the combustion fluids are projected inwardly from the chamber 17. These fluids when ignited form a substantially continuous annular sheet of flame which impinges against the tubular wall 2 of the glass article B. This thin and intensely hot sheet of flame serves to melt through the glass wall, and preferably the burner and glass article B are given relative rotation about the central vertical axis of the glass article so as to provide a continuous and even line of severance. In the present example the chuck A and glass article B are rotated while the burner C is stationary, but the burner may be rotated and the glass article held stationary if preferred.

When the wall 2 has been melted through, the moil 4 drops away, and the intensity of the cutting flame is preferably reduced so as to fire-finish the lower edge portion of the glass article which edge will assume the form of a rounded bead substantially as indicated at 23 in Fig. 1. Substantially all of the above described process and apparatus is now well known in this art.

According to the present invention, an inside burner D is provided for projecting a cutting flame against the inner surface of the article B in line with and in opposition to the cutting flame projected from the outside burner C. This burner D comprises the supporting post or stem 24 which is mounted in the bracket 25 by means of adjusting screw 26 provided with lock nut 27. Screw 26 projects into a vertical slot 28 so that the vertical positioning of the burner D may be adjusted. The burner proper comprises the lower ring 29 supported on the shouldered portion 30 of post 24, and the upper ring 31 held in place by nut 32 threaded on the reduced upper extension 33 of post 24. The rings 29 and 31 enclose the chamber 34 and clamp in place the shim 35 which may be of the form shown in Fig. 2. The combustion fluids are delivered through pipe 36 and passage 37 in post 24, which passage communicates through ports 38 with the chamber 34 between the burner rings 29 and 31, the fluids flowing out through the slots 22 between the teeth 20 of shim 35 to supply the outwardly projected cutting flame which impinges against the inner surface of the wall 2 of the tumbler B.

The supply of combustion fluids through pipes 18 and 36 will be controlled simultaneously so that the two cutting flames will be turned on and off as a unit and will cooperate to melt through the wall of the glass article. It will be noted that these flames are opposed to one another along the same annular line or section of the glass wall. By the simultaneous use of these two cutting flames glass articles having walls of much greater thickness may be cut in this manner, or the time required for the severing of any given glass article may be reduced by substantially one-half. Also, by properly controlling the timing and intensity of the two flames the shape and dimensions of the bead 23 may be regulated as desired.

The modification shown in Fig. 5 is much the same as the apparatus shown in Fig. 4 and hereinabove described, with the addition of an extension 39 screwed on the upper end 33 of post 24 in lieu of the locking nut 32. A head 40 which is adapted to engage the inner surface of the closed end 1 of the glass article is rotatably supported on the upper end of post extension 39 by means of the roller bearing indicated generally at 41. This permits the head 40 to rotate, along with the chuck A and glass article B while the post 39 remains stationary. The chuck A is vertically movable to bring the glass article into and out of cutting position, and its downward movement is limited by engagement with the head 40 so that the line of cut will be accurately spaced from the inner surface of the bottom of the tumbler. This will permit a variation in the thickness of the bottoms of different tumblers while at the same time insuring a uniform inner height or capacity for the tumbler or other receptacle. In other words, this inner spacing device insures an accurate positioning of the line of severance with relation to the inner height of the glass article.

A preferred form of the apparatus will now be described, referring to Figs. 1, 2 and 3, in which form the glass article is supported entirely from within, the exterior chuck A not being required. The outside burner C' is substantially the same as the burner C previously described and is mounted in a seat 42 formed in the top of a casting 43 mounted on the supporting frame 43'. It is to be understood that a plurality of units similar to that now being described will usually be mounted at fixed intervals around the periphery of a table or frame which rotates continuously about a central vertical axis, a portion of this supporting table being indicated at 43'. At one position in the rotary path of each unit the finished tumbler B is removed and a new article B to be burned off is placed in the burn-off unit, and the burning or cutting process takes place during the travel of the unit around the circuit as the supporting table rotates. The various valves and control devices are actuated at certain locations along this circular path of travel by fixed cams which engage members carried by the rotating assembly, as is well known in this art.

The inside burner D' is supported at the upper end of a tubular casting 44 which is seated at 45 in the main supporting casting 43. The lower annular member 46 of burner D' is seated on the collar 47 at the upper end of sleeve 44 and is fitted about the inner sleeve member 48 which is telescoped within the upper end of sleeve 44. The upper annular member 49 of the burner D' is threaded at 50 on the upper threaded end portion 51 of an inner sleeve 52 which is secured at its lower end 53 in the main casting 43 and which has a collar 54 fitting within the upper portion of the connecting sleeve 48. The two annular members 46 and 49, together with the connecting sleeve 48, enclose the fluid supply chamber 55 which communicates through ports 56 formed in the sleeve 48 with the annular space 57 formed between the inner and outer fixed sleeve members 52 and 44. A shim 35 of the type shown in Fig. 2 is clamped between the annular members 46 and 49. Since the member 49 is threaded on the fixed sleeve 51, it may be adjusted toward or from the lower annular member 46 so as to vary the width of the slot in which the shim 35 is positioned. In this manner the size of the outlet ports may be adjusted without the necessity of substituting shims 35 of different thicknesses or using a plurality of shims.

As an alternative construction one or both of the annular members 46 and 49 of the burner may be radially slotted as indicated at 58 in Fig. 3, thus eliminating the necessity of using a shim such as indicated at 35 in Fig. 2.

An elastic centering ring 59 adapted to fit yieldably within the glass article B and properly center the same is secured in place on the upper burner section 49 by means of the washers 60 and 61 and the nut 62 screwed on sleeve member 51. An inner tubular shaft 63 is rotatably mounted in bearings 64 and 65 in the upper and lower ends of the fixed sleeve 52, and threaded on the upper end of this shaft 63 is an extension 66 which carries the chuck head 67. This head is adapted to engage the inner surface of the closed end 1 of the glass article B, and suction ports 68 formed in head 67 communicate with a chamber 69 into which leads the passage 70 extending through the tubular shaft. The lower end portion of shaft 63 has a bearing at 71 in the bracket arm 72 extending downwardly and outwardly from casting 43, and the lower end of the shaft is supported by the thrust plate 73 clamped in place between the lower surface of bracket arm 72 and a casting 74 secured to the bracket arm 72 by bolts 75. The passage 70 extending through tubular shaft 63 leads through opening 76 in thrust plate 73 to a chamber 77 formed in casting 74 which chamber communicates through valve opening 78 with a second chamber 79 into which leads the pipe 80 which extends from a suitable exhausting mechanism or vacuum chamber. The valve 81 which is adapted to engage the valve seat 78 is carried at the upper end of a valve stem 82 which is vertically slidable through a packing means 83 held in place by gland 84 screwed into the lower end of casting 74. A compression spring 85 confined between the lower end of gland 84 and a collar 86 secured on the lower end of stem 82 tends to pull the valve 81 down against the seat 78. A lever 87 is intermediately pivoted at 88 in the lower end of a bracket arm 89 extending downwardly from casting 74. The outer end of lever 87 carries a roller 90 adapted to engage the lower end of valve stem 82, and the inner end of the lever carries a roller 91 which engages a fixed cam 92. The cam 92 is so shaped and positioned that during the greater part of the circular travel of the unit the valve 81 will be held open (as shown in Fig. 1) and the several passages connecting supply pipe 80 with suction ports 68 in head 67 will be in open communication with one another so that the glass article B will be held by vacuum against the head 67. At that position in the annular path of travel of the unit where the finished glass article B is to be removed and a new one positioned on the chuck, the roller 91 passes out of engagement with cam 92 so that spring 85 is effective to close the valve 81. Sufficient leakage is provided for so that the suction will be broken and the burned-off article B may now be removed from the chuck and a new one positioned in its place. As soon as the unit advances from this position, the cam 92 will engage the roller 91 and open the valve 81 so that suction will again be exerted through head 67 to hold the glass article B in position during the subsequent cutting process.

The supply pipe 93 for the combustion fluid is provided with the adjustable cut-off valve 94 and leads into the T-fitting 95 from one arm of which the pipe 96 leads into the outside burner C'. A connection 97 leads from the other arm of the T coupling into the passage 98 in casting 43 which communicates through passage 99 with the chamber 100 into which connects the lower end of the annular passage 57 between fixed sleeve members 44 and 52. Through these several pipes and passages the combustion fluids are simultaneously supplied to the two burners C' and D'. It will be understood that an automatic cam-operated valve mechanism is provided in the supply pipe 93, as usual in machines of this type, for regulating the supply of combustion fluids to the burners at different positions in the annular path of travel of the cut-off unit. The burners may always be allowed to burn to a limited extent, or they may be cut off entirely during a portion of the time and re-ignited by a pilot burner (not here shown). The tubular shaft 63 and suction head 67 carried thereby is constantly rotated, at a rather slow speed, so as to cause the glass article B to be rotated with relation to the burners C' and D' during the burn-off operation. As here shown, a sprocket wheel 101 is keyed at 102 on a lower portion of shaft 63, the several sprockets 101 of the various units being engaged by a continuous sprocket chain which is driven in any suitable manner.

In operation, a blown glass article B is positioned (either by hand or mechanically) on the supporting chuck 67 so that the portion to be cut off projects down between the two burners C' and D'. Subsequently the valve controlling the fuel supply is operated so as to cause the flames to be projected with considerable force against the two sides of the rotating glass wall so that this wall will be melted through along the predetermined annular line. The moil will drop away, and the valve mechanism is so timed that the flames will be immediately reduced in intensity so as to fire-finish the lower exposed edge of the tumbler or other article with the result that the rounded bead 23 is formed thereon.

It will be noted that the moil, shown in Fig. 1 at 103, will encircle the supporting sleeve 44 and it is necessary to break up this moil in order to remove it from the machine. This moil falls into a chamber 104 formed in casting 43, which chamber has a sloping floor 105 formed on sleeve 44 which aligns with a spout extension 106 formed in the outer side of casting 43. A chilling agent such as compressed air or water is delivered into chamber 104 through pipe 107 and inlet opening 108, and the hot moil 103 will be cracked up by engagement with this chilling agent and with the metallic floor 105, the pieces sliding out through spout 106 into a suitable collection receptacle. As an alternative construction, a mechanical means may be utilized to strike the moil 103 a sharp blow sufficient to break it up.

While it is preferred to use the combination of outside and inside burners in order to reduce the time required for the operation, and in order to secure the other advantages mentioned hereinabove, the inside burner may be used alone, as the outside burner has been used alone in the past.

If the glass article is supported from inside, as shown in Fig. 1, the outside of the tumbler or other article is left entirely free of all mechanical devices which will permit the free application of outside heat for fire-finishing the glassware. The outside burner could even be arranged in sections to open and close, in the event that both burners are used.

The passages through the inside chuck mechanism for creating the suction which holds the glass article in position could also be used to introduce air for cooling to prevent possible collapse of the article during the fire-polishing operation.

I claim:

1. Apparatus for cutting off a hollow glass article and forming a permanent exposed edge thereon comprising a chuck adapted to project centrally through the open end of the article and engage the interior surface thereof remote from the open end to support the article, and an annular burner positioned to project a flame against a portion of the article not engaged by the chuck to melt the wall along a predetermined annular line.

2. Apparatus for cutting off a hollow glass article and forming a permanent exposed edge thereon comprising a chuck adapted to project within the article and engage the interior surface thereof to support the article, and an annular burner also positioned within the article and adapted to project a flame against the inner wall of the article along a predetermined annular line.

3. Apparatus for cutting off a hollow glass article and forming a permanent exposed edge thereon comprising a chuck adapted to project within the article and engage the interior surface thereof to support the article, and a pair of annular burners positioned one inside and one outside the article and adapted to project opposed flames against the wall of the article to melt it along a predetermined annular line.

4. Apparatus for cutting off a hollow glass article and forming a permanent exposed edge thereon comprising a burner positioned within the article and projecting a flame against the inner wall thereof, and a chuck housed within the article for supporting the article and rotating it with relation to the burner so that the flame will contact the article along the desired annular line of severance.

5. Apparatus for cutting off a portion of a hollow glass article having one closed end and a tubular side wall comprising holding means adapted to project centrally within and support the article without engaging with the side wall adjacent the open end and an annular burner adapted to project a melting flame against the tubular wall of the article, the holding means engaging the inner surface of the closed end of the article to space the burn-off line therefrom.

6. Apparatus for cutting off a portion of a hollow glass article having one closed end and a tubular side wall comprising a chuck assembly adapted to project within and support the article and an annular burner associated with the chuck assembly and positioned within the article and adapted to project a melting flame against the tubular wall of the article, the chuck engaging the inner surface of the closed end of the article to space the burn-off line therefrom.

7. Apparatus for cutting off a portion of a hollow glass article having one closed end and a tubular side wall comprising a chuck assembly adapted to project within and support the article and an annular burner associated with the chuck assembly and positioned within the article and adapted to project a melting flame against the tubular wall of the article, the chuck engaging the inner surface of the closed end of the article to space the burn-off line therefrom and to rotate the article with relation to the burner.

8. Apparatus for cutting off a portion of a hollow glass article having one closed end and a tubular side wall comprising a chuck assembly adapted to project within and support the article and a pair of annular burners one positioned outside of and encircling the article and the other positioned within the article and associated with the chuck, the burners adapted to project opposed flames against the tubular wall of the article, and means for rotating a portion of the chuck to rotate the article.

9. Apparatus for cutting off a portion of a hollow glass article having one closed end and a tubular side wall comprising a chuck assembly adapted to project within and support the article and a pair of annular burners one positioned outside of and encircling the article and the other positioned within the article and associated with the chuck, the burners adapted to project opposed flames against the tubular wall of the article, means for rotating a portion of the chuck to rotate the article, and means for breaking up and removing the annular moil burned off from the article.

10. Apparatus for cutting off a portion of a hollow glass article having one closed end and a tubular side wall comprising a chuck assembly adapted to project within and support the article and a pair of annular burners one positioned outside of and encircling the article and the other positioned within the article and associated with the chuck, the burners adapted to project opposed flames against the tubular wall of the article, means for rotating a portion of the chuck to rotate the article, and means for directing a chilling fluid against the moil when burned off from the article.

11. A burner for cutting off tubular glass articles comprising a central hollow support, a pair of annular members carried by the hollow support and enclosing an annular chamber to which combustion fluids are fed through the hollow support, there being an annular slot between the outer portions of the annular members through which the fluids emerge to supply an annular flame, and means for adjusting one annular member toward or from the other to determine the effective thickness of the slot.

12. Apparatus for cutting off a portion of a hollow glass article having one closed end and a tubular side wall comprising a chuck assembly having a portion adapted to project within and support the article, an annular burner positioned to project a flame against the tubular wall of the article and to sever an annular moil from the supported article, and means for breaking up and removing the annular moil from about the chuck assembly.

13. Apparatus for cutting off a portion of a hollow glass article having one closed end and a tubular side wall comprising a chuck assembly having a portion adapted to project within and support the article, means for rotating a portion of the chuck to rotate the article, an annular burner positioned to project a flame against the tubular wall of the article and to sever an annular moil from the supported article, and means for breaking up and removing the annular moil from about the chuck assembly.

AUGUST KADOW.